(12) United States Patent
Hammad et al.

(10) Patent No.: US 12,388,104 B2
(45) Date of Patent: Aug. 12, 2025

(54) MANUFACTURING MIXED FE/V ELECTROLYTES FOR FLOW BATTERIES

(71) Applicant: Saudi Arabian Oil Company, Dhahran (SA)

(72) Inventors: Ahmad D. Hammad, Dhahran (SA); Issam T. Amr, Khobar (SA); Yueqi Liu, Mukilteo, WA (US); Zhenguo Yang, Bellevue, WA (US)

(73) Assignee: Saudi Arabian Oil Company, Dhahran (SA)

( * ) Notice: Subject to any disclaimer, the term of this patent is extended or adjusted under 35 U.S.C. 154(b) by 192 days.

(21) Appl. No.: 17/671,948

(22) Filed: Feb. 15, 2022

(65) Prior Publication Data
US 2023/0261232 A1    Aug. 17, 2023

(51) Int. Cl.
| | | |
|---|---|---|
| *H01M 8/00* | (2016.01) | |
| *H01M 8/08* | (2016.01) | |
| *H01M 8/18* | (2006.01) | |

(52) U.S. Cl.
CPC ............... *H01M 8/18* (2013.01); *H01M 8/08* (2013.01); *H01M 8/188* (2013.01); *H01M 2300/0005* (2013.01); *H01M 2300/0011* (2013.01)

(58) Field of Classification Search
CPC .. H01M 8/18; H01M 8/08; H01M 2300/0011; H01M 8/188; H01M 2300/0005; Y02E 60/50
See application file for complete search history.

(56) References Cited

U.S. PATENT DOCUMENTS

| | | | |
|---|---|---|---|
| 9,559,375 | B2 | 1/2017 | Savinell et al. |
| 11,901,598 | B2 * | 2/2024 | Hammad ............ H01M 8/188 |
| 2011/0223450 | A1 | 9/2011 | Horne |
| 2012/0077068 | A1 | 3/2012 | Wang |
| 2013/0004819 | A1 * | 1/2013 | Mun .................. H01M 8/188 |
| | | | 429/106 |
| 2018/0102561 | A1 * | 4/2018 | Sullivan ................ C01G 31/02 |
| 2021/0083309 | A1 | 3/2021 | Hammad et al. |
| 2021/0399323 | A1 | 12/2021 | Hammad et al. |
| 2023/0261233 | A1 | 8/2023 | Hammad et al. |

FOREIGN PATENT DOCUMENTS

| | | |
|---|---|---|
| CN | 103700872 | 4/2014 |
| CN | 107863536 | 3/2020 |

OTHER PUBLICATIONS

Li et al. "Fe/V redox flow battery electrolyte investigation and optimization" Journal of Power Sources, 229 (2013) pp. 1-5 (Year: 2013).*

Yang et al. "Improved broad temperature adaptability and energy density of vanadium redox flow battery based on sulfate-chloride mixed acid by optimizing the concentration of electrolyte" Journal of Power Sources; vol. 415, Mar. 1, 2019, pp. 62-68 (Year: 2019).*

(Continued)

*Primary Examiner* — Nicholas P D'Aniello
(74) *Attorney, Agent, or Firm* — Fish & Richardson P.C.

(57) ABSTRACT

An electrolyte, a method for making the electrolyte, and a flow cell battery are provided. The electrolyte includes about 1.0 molar (M) to about 1.5 M iron ions and about 1.0 M to about 1.5 M vanadium ions.

7 Claims, 8 Drawing Sheets

(56) References Cited

OTHER PUBLICATIONS

Li et al., "Fe/V redox flow battery electrolyte investigation and optimize," Journal of Power Sources, May 2013, 5 pages.
PCT Invitation to Pay Fees and, where applicable, Protest Fee in International Appln No. PCT/US2023/013022, dated May 19, 2023, 13 pages.
Wang et al., "A new hybrid redox flow battery with multiple redox couples," Journal of Power Sources, 2012, 216:99-103, 5 pages.
Xu et al., "Modeling the effect of temperature on performance of an iron-vanadium redox flow battery with deep eutectic solvent (DES) electrolyte," 2020, 449:227491, 10 pages.
Zhao et al., "Performance improvement of non-aqueous iron-vanadium flow battery using chromium oxide-modified graphite felt electrode," Ionics, 2021, 27:4315-4325, 11 pages.
PCT International Search Report and Written Opinion in International Appln No. PCT/US2023/013022, dated Aug. 1, 2023, 20 pages.
PCT International Search Report and Written Opinion in International Appln. No. PCT/US2023/013021, dated Aug. 1, 2023, 14 pages.
Li et al., "A new iron/vanadium (Fe/V) redox flow battery," Electrical Energy Storage Applications and Technologies (EESAT) 2011, Biennial International Conference, Oct. 16-19, 2011, 4 pages.
Sánchez-Díez at al., "Redox flow batteries: Status and perspective towards sustainable stationary energy storage," Journal of Power Sources, 2021, 23 pages.

\* cited by examiner

202

MANUFACTURING MIXED FE/V ELECTROLYTES FOR FLOW BATTERIES

TECHNICAL FIELD

The present disclosure is directed to increasing the reactant utilization and energy density in Fe/V mixed chloride and sulfonate flow batteries.

BACKGROUND

Energy storage is increasingly demanded in the deployment of renewable energy resources and the improvement of the electrical grid reliability and efficiency. It is considered a critical enabler to the transformation from current fossil economy to zero-carbon one.

Nearly all the countries in the Middle East and North Africa (MENA) region are blessed with abundant renewable energy sources due to its unique geographical location. For example, the direct solar radiation (insolation) in the MENA region exceeds 6 kWh/m$^2$. However, the renewables are intermittent, requiring large-scale energy storage systems for continuous and reliable power output. The overall development plan should adopt and focus on the right energy storage technologies that would suit the needs and climate in the MENA region. Long duration batteries that have capacities up to multi-megawatt levels, such as flow batteries, are considered a suitable option for shifting this large power in time as needed.

A flow battery is an energy storage technology that stores power as chemical energy in flowing solutions from separate storage tanks, termed catholyte and anolyte. Flow batteries are among the most promising storage options and have the potential to be more flexible than other competitors, for example, due to their low cost and scalability. In a flow battery, the electrolytes are circulated through electrochemical cells, where they are separated by an ion exchange membrane (IEM). Electricity is converted to chemical energy in the electrochemical cells for storage, and then released during discharge. Unique to flow batteries is the ability to independently vary energy and power capacity. Energy capacity is defined by the volume of the electrolyte stored in the tanks and the concentration of redox couple species, whereas the power rating is defined by the size of electrodes and the number of cells in a stack.

SUMMARY

An embodiment described in examples herein provides an electrolyte for a flow cell battery. The electrolyte includes about 1.0 molar (M) to about 1.5 M iron ions and about 1.0 M to about 1.5 M vanadium ions.

Another embodiment described in examples herein provides a method for preparing an electrolyte for a flow cell battery. The method includes heating an acid solution, adding a first vanadium salt to the acid solution, and adding a second vanadium salt to the acid solution. The acid solution is stirred until both vanadium salts have dissolved. An iron salt is dissolved in the acid solution.

Another embodiment described in examples herein provides a flow cell battery. The flow cell battery includes an electrochemical cell. The electrochemical cell includes an ion exchange membrane, an anode current collector, and a cathode current collector, wherein a space between the ion exchange membrane and the anode current collector forms a first channel, a space between the ion exchange membrane and the cathode current collector forms a second channel, and wherein the ion exchange membrane is configured to allow ions to pass between the first channel and the second channel. The flow cell battery includes a first tank configured to flow an anolyte through the first channel at a first rate, and a second tank configured to flow a catholyte through the second channel at a second rate. The catholyte, or both the catholyte and the anolyte, includes about 1.0 molar (M) to about 1.5 M iron ions, and about 1.0 M to about 1.5 M vanadium ions.

DETAILED DESCRIPTION

Figure 1:
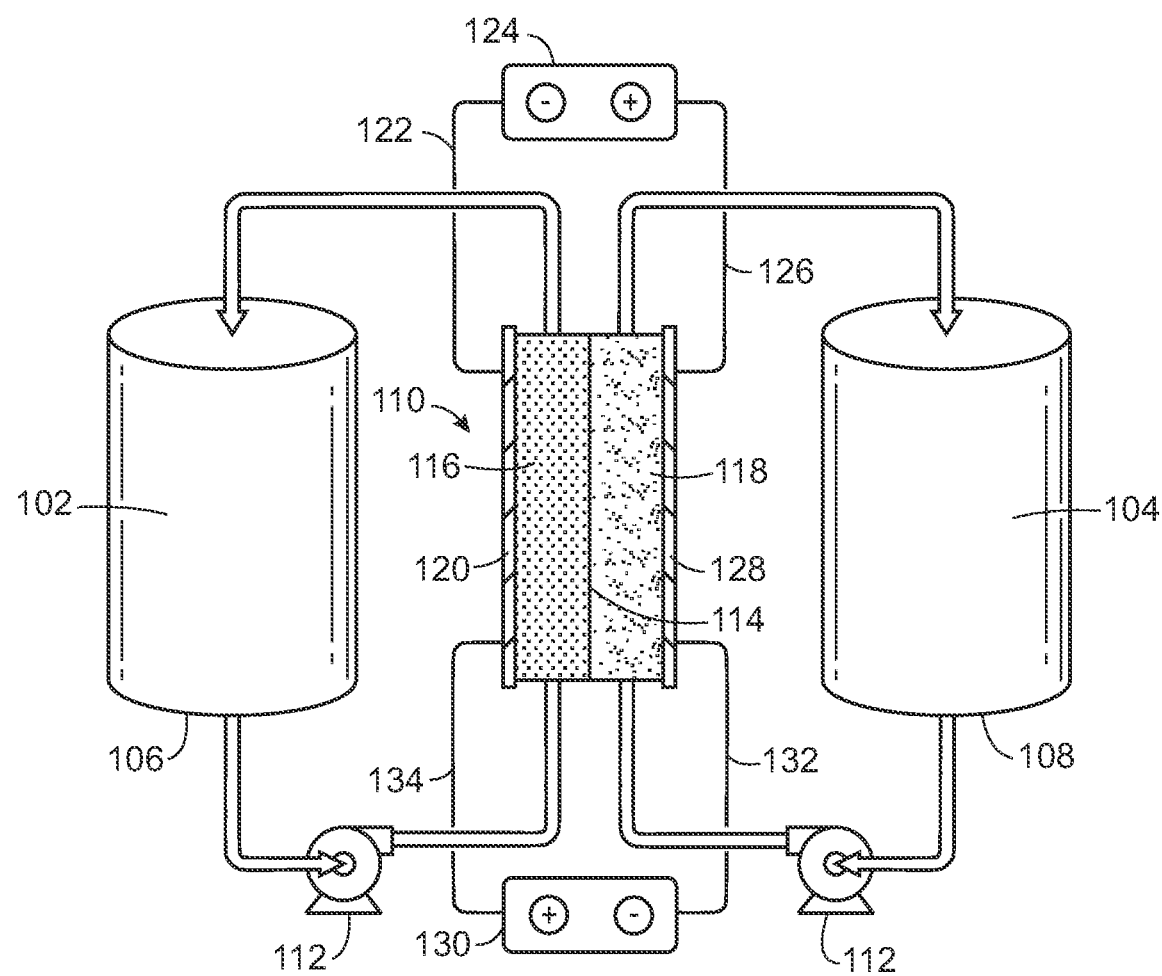
FIG. 1 is a drawing of a flow battery using two electrolytes.

Electrolysis is commonly used to prepare separate catholyte and anolyte solutions, but this method is time-consuming and inefficient. Examples described herein provide a chemical method for making a mixed electrolyte solution of iron and vanadium ions that can be used in flow cell batteries as both anolyte and catholyte. The method uses a direct chemical dissolution of each of the components in an acid mixture to form the mixed ion solution.

In some embodiments described herein, the charging voltage is increased to 1.6 volts (V) to convert a portion of the vanadium ions in the catholyte to $V^{5+}$. Specifically, the higher charging voltage oxidizes a portion of the $V^{4+}$ ions in the catholyte to form $V^{5+}$ ions. During charging, $Fe^{2+}$ ions in the catholyte are oxidized to $Fe^{2+}$ at voltages up to 1.4 V, at the higher voltages the $V^{4+}$ ions are oxidized to form $V^{5+}$ ions.

However, as described herein, higher temperatures can lead to the precipitation of compounds of $V^{5+}$. The precipitation of these compounds occurs at positive side of the battery, and starts at about 40° C. at a 100% ratio of the $V^{5+}$ ions. This causes damage to the flow cell battery. The damage may be prevented by limiting the concentration of the ratio of $V^{5+}$ ions to $V^{4+}$ ions, as described with respect to Table 1.

The data in Table 1 shows stability tests of the battery at ratios of about 50%, about 60%, about 70% and about 80% $V^{5+}$ ions to $V^{4+}$ ions at temperatures above about 40° C., such as about 55° C. and about 60° C. Testing at about 60° C. indicates that the concentration ratio of $V^{5+}$ ions to $V^{4+}$ ions is reduced to about 60%, at which the flow cell battery shows stable behavior.

TABLE 1

Stability tests at different concentration ratios of $V^{5+}$ to $V^{4+}$

| | Electrolyte Sample | | | |
|---|---|---|---|---|
| Electro-lyte Tem-perature | Catholyte (#1) 1.25M $Fe^{3+}$ 0.625M $V^{4+}$ (50%) 0.625M $V^{5+}$(50%) | Catholyte (#2) 1.25M $Fe^{3+}$ 0.50M $V^{4+}$ (40%) 0.75M $V^{5+}$(60%) | Catholyte (#3) 1.25M $Fe^{3+}$ 0.375M $V^{4+}$ (30%) 0.875M $V^{5+}$(70%) | Catholyte (#4) 1.25M $Fe^{3+}$ 0.25M $V^{4+}$(20%) 1.0M $V^{5+}$(80%) |
| 55° C. | Stable (30 days) | Stable (25 days) | Stable (25 days) | Not Stable (>11 days) |
| 60° C. | Stable (30 days) | Stable (25 days) | Not Stable (8 days) | Not Stable (>4 days) |

Accordingly, in embodiments described herein, the amount of the $V^{5+}$ ions formed in the catholyte is controlled to ensure that no more than about 50% to about 60% of the $V^{4+}$ ions are converted to $V^{5+}$ ions. Limiting the proportion of the $V^{5+}$ ions to less than about 60% of the total vanadium ions present decreases the possibility of precipitation of the $V^{5+}$ ions at operating temperatures of up to about 40° C., and increases the temperature range to meet operating requirements in hot environments, such as countries in the Middle East and North Africa (MENA). Additionally, the iron ions are more stable at higher temperatures than the vanadium ions, and thus, the presence of the iron ions does not affect the stability of the electrolytes.

To take advantage of the increased energy density, the ratio of anolyte to catholyte is changed to 3:2 from 1:1, which improves the reactant utilization of the ions in the catholyte. During discharge, the $V^{5+}$ ions in the catholyte are reduced to $V^{4+}$ ions first, after which the $Fe^{3+}$ ions are reduced to $Fe^{2+}$. In the anolyte, the iron ions do not participate in the reaction, which uses a $V^{3+}/V^{2+}$ half-cell.

Thus, higher energy density batteries can be made that are stable at the higher temperatures. As iron is lower in cost than vanadium, it also reduces the capital cost of the Fe/V mixed acid flow batteries.

FIG. 1 is a drawing of a flow battery 100 using two electrolytes. In the flow battery 100, the energy is stored in electrolytes 102 and 104, which are termed anolyte 102 and catholyte 104, herein. The electrolytes 102 and 104 are stored in tanks 106 and 108 and are separately pumped from the tanks 106 and 108 to an electrochemical cell 110 by dedicated pumps 112.

In some embodiments, an ion exchange membrane 114 is used in the electrochemical cell 110. The ion exchange membrane 114 separates the electrolytes 102 and 104 to prevent energy loss by short-circuiting, while allowing protons, or other ions, to pass between the sides during charge and discharge cycles, and maintain electroneutrality. In some embodiments, the ion exchange membrane 114 is a sulfonated tetrafluoroethylene, for example, commercially available as NAFION® from DuPont Chemical of Wilmington Virginia. The ion exchange membrane 114 generally controls the efficiency of the flow battery 100, and is a significant contributor to the cost of the flow battery 100. Accordingly, in some embodiments, the ion exchange membrane 114 is omitted and the electrolytes 102 and 104 are generally kept from mixing by laminar flow or is made unnecessary by battery design, such as if a single electrolyte solution is used.

As the electrolytes 102 and 104 are pumped through the electrochemical cell 110, they pass through channels 116 and 118. The channels 116 and 118 may include a porous electrode material, such as felt, or Rainey nickel, among others, to allow ions and electrons to flow between the electrolytes 102 and 104. In some embodiments, for example, when the ion exchange membrane 114 is omitted, the channels 116 and 118 may be narrow to enhance laminar flow.

During the production of power, the anolyte 102 is oxidized, losing electrons to the anode current collector 120. The electrons are transferred by a line 122 to a load 124. After powering the load 124, the electrons are returned to the electrochemical cell 110 by another line 126. The electrons reenter the electrochemical cell 110 from the cathode current collector 128, reducing the catholyte 104.

The anolyte 102 and catholyte 104 are regenerated during a charging cycle. During the charging cycle, a power source 130 removes electrons from the cathode current collector 128 through a line 132, oxidizing the catholyte 104 to its initial state in the reverse of equation 2. The electrons are provided to the anode current collector 120 from the power source 130 through another line 134, reducing the anolyte 102 to its initial state in the reverse of equation 1.

One of the most established technologies for flow batteries is based on vanadium redox chemistry and is termed the vanadium redox flow battery (VFB). In VFBs, vanadium ions are dissolved in an aqueous acid supporting electrolyte. VFBs are often based on $V^{2+}/V^{3+}$ and $V^{4+}/V^{5+}$ redox couples.

For a vanadium ion flow cell battery, during discharge, the reaction of the anolyte 102 at the anode current collector 120 is shown in equation 1.

$$V^{2+} \rightarrow V^{3+} + e^-, E^0 = -0.25 \text{ V Vs SHE} \quad (1)$$

During discharge, the reaction of the catholyte 104 at the cathode current collector 128 is shown in equation 2.

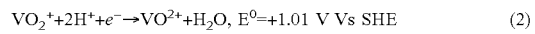
$$VO_2^+ + 2H^+ + e^- \rightarrow VO^{2+} + H_2O, E^0 = +1.01 \text{ V Vs SHE} \quad (2)$$

In VFBs, the vanadium ions are dissolved in an aqueous acid supporting electrolyte. Since the first demonstration of VFB, several studies have been carried out in order to investigate the effects of various electrochemical, chemical, and physical variables to optimize the related system operation parameters with negligible capacity reduction.

Although VFBs are currently being used commercially, there are problems associated with their performance at temperatures higher than about 40° C., where $V^{5+}$ ions may precipitate. These problems may limit their use in hot environments, such as the MENA countries.

Accordingly, a flow battery based on Fe/V redox chemistry has been explored as a potential option for lowering costs for large-scale energy storage, as the utilization of Fe ions in the positive side instead of $V^{5+}$ ions potentially leads to a significant improvement in operation temperature window over all Vanadium flow batteries. Further, iron is lower cost than vanadium lower the material cost of the flow batteries.

In an Fe/V flow battery, during the discharge cycle of the flow battery, the catholyte 104 includes Fe(III) which is reduced to Fe(II) at the cathode current collector 128 (+), while the anolyte 102 includes V(II) which is oxidized to V(III) at the anode current collector 120 (−), according to the reactions shown below:

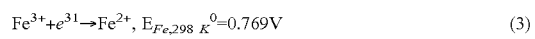
$$Fe^{3+} + e^{31} \rightarrow Fe^{2+}, E_{Fe,298\,K}^0 = 0.769V \quad (3)$$

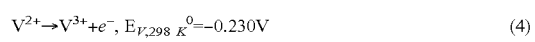
$$V^{2+} \rightarrow V^{3+} + e^-, E_{V,298\,K}^0 = -0.230V \quad (4)$$

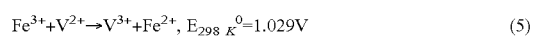
$$Fe^{3+} + V^{2+} \rightarrow V^{3+} + Fe^{2+}, E_{298\,K}^0 = 1.029V \quad (5)$$

However, Fe/V flow batteries may be difficult to commercialize. For example, cross contamination of the two half-cell electrolytes due to the passage of iron and vanadium ions across the membrane can lead to discharge decay, lowering the lifespan of the electrolytes.

Further, Fe/V redox flow batteries have a low energy density compared to VFB systems, due to lower cell operating voltage across the cathode and anode, and inefficient utilization of the reactants in the catholyte 104. This is generally due to a lower reactant concentration in the electrolyte than in VFBs. Iron ions have a low solubility in hydrochloric acid and sulfate acid that limits the total concentration of the Fe and V ions in the Fe/V/HCl cell to about 1.5 mol $L^{-1}$.

Figure 2:
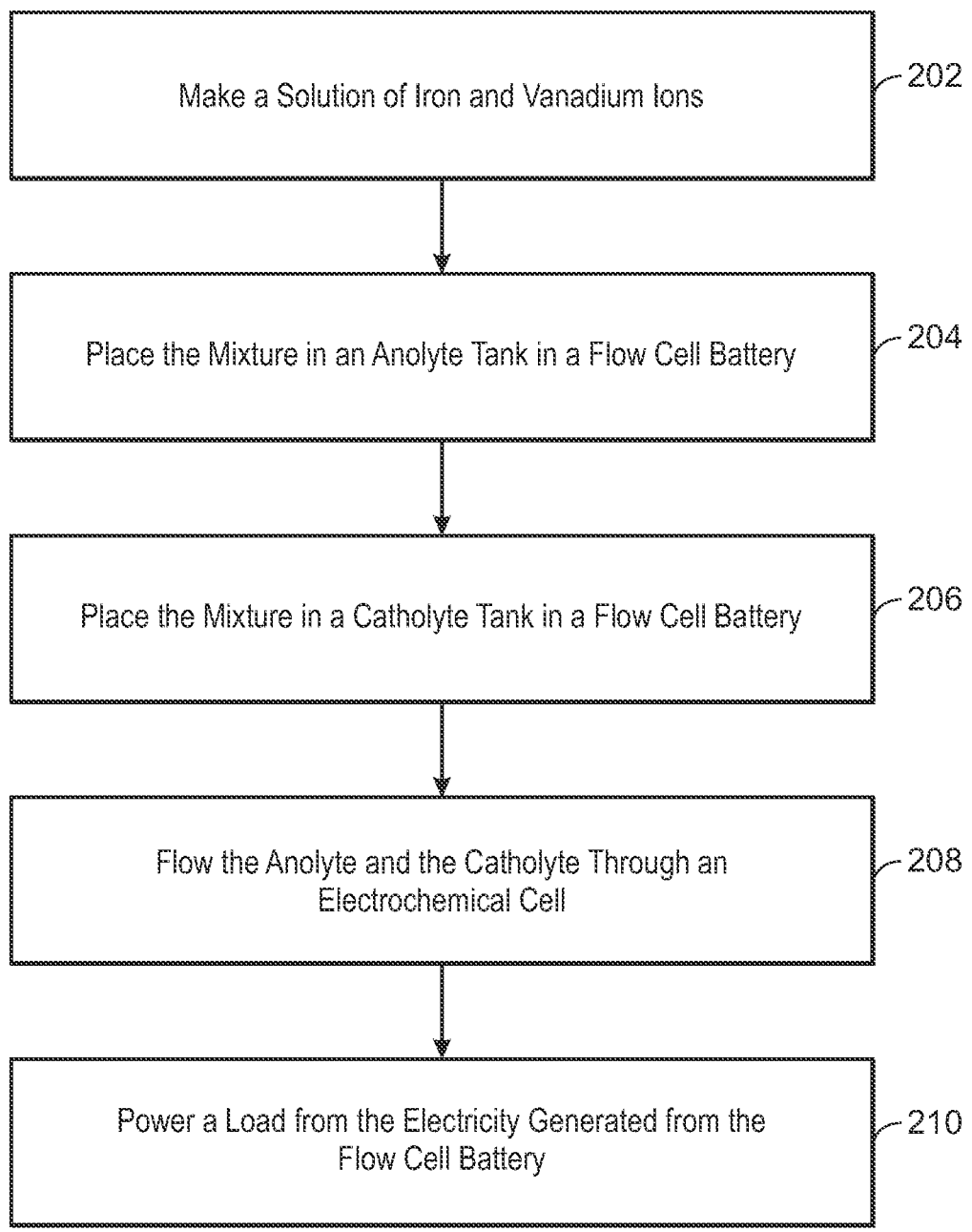
FIG. 2 is a method for operating an Fe/V flow cell to obtain higher energy density.

FIG. 2 is a method 200 for operating an Fe/V flow cell to obtain higher energy density. The method begins at block 202 with the preparation of a solution on iron and vanadium ions. This may be performed by dissolving vanadium salts in a strong acid, such as concentrated HCl, for example, to form a solution at a concentration of about 1.5 M based on solubility. An iron salt is then dissolved in the acid, for example, to form a mixed ion solution that has about 1.5 M vanadium ions, in addition to the iron ions.

At block 204, an anolyte tank in a flow cell battery is filled with the mixed ion solution. At block 206, a catholyte tank is filled with the mixed ion solution.

At block 208, the anolyte and the catholyte are flowed through an electrochemical cell to generate electricity. In embodiments described herein, the power output is controlled by the total charge voltage and the volume ratio of the catholyte to the anolyte, for example, at a 2:3 ratio of catholyte to anolyte. This may be adjusted by controlling the flow rate through the electrochemical cell. At block 210, a load is powered from the electricity generated from the flow cell battery.

The utilization of $V^{4+}/V^{5+}$, in addition to the $Fe^{2+}/Fe^{3+}$, on the positive side of a mixed V/Fe chloride/sulfide flow cell battery allows the energy density of the Fe/V flow cell battery to be increased by about 30%, for example, due to the optimization in volume ratio by flow rate. The improvements in energy density and reagent utilization may reduce the capital cost of the Fe/V mixed acid flow batteries by 25% to 30%, or more. Further, the mixed electrolyte battery has an increased tolerance for high temperatures, such as about 40° C. or higher, over a VFB, due to the 60% limit placed on the conversion of $V^{4+}$ to $V^{5+}$. This allows the flow cell battery to meet operational requirements in the MENA region.

Figure 3:
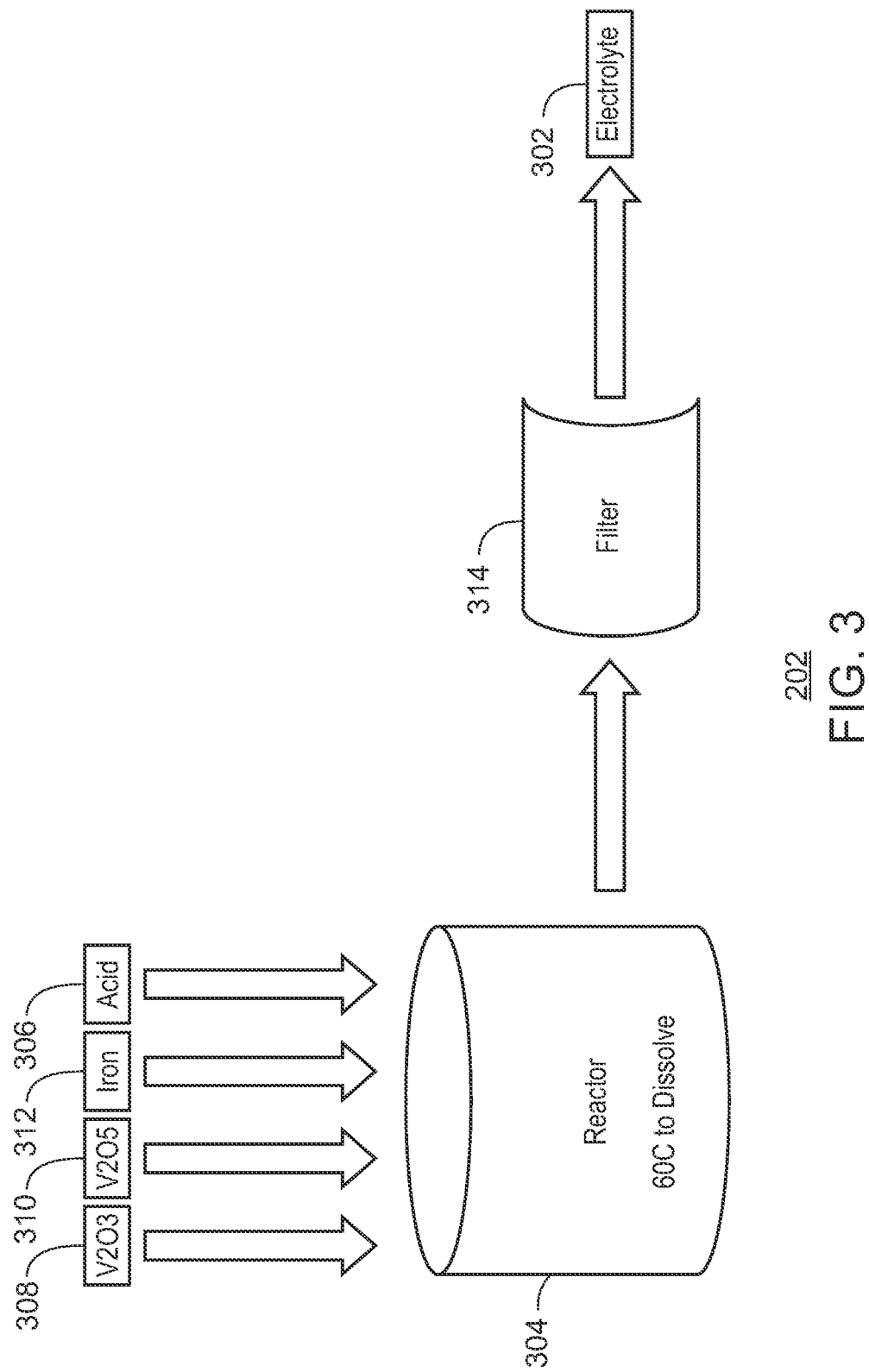
FIG. 3 is a schematic diagram of a procedure for making the mixed ion electrolyte solution.

FIG. 3 is a schematic diagram of a procedure 302 for making the mixed ion electrolyte solution. This procedure corresponds to block 202 of FIG. 2. The solution is mixed in a reactor 304, which can be a batch reactor, a continuous stirred tank reactor (CSTR), or a loop reactor including a static mixer. The selection of the reactor is based on the mixing time and heating. In some embodiments, the reactor is a batch reactor to allow multi-hour mixing times.

An acid 306 is added to the reactor 304. The acid 306 includes hydrochloric acid, for example, HCl (con). In some embodiments, the acid may be a mixture of hydrochloric acid and sulfuric acid.

The acid 306 in the reactor 304 is heated, for example, to between about 50° C. and about 70° C., or about 60° C. to dissolve the vanadium salts. To the heated acid 306 in the reactor 304, vanadium (III) oxide 308 and vanadium (V) oxide 310 are added in equal amounts to form a solution having, after dissolution, a concentration of between about 1.0 molar (M) and about 1.5 M of vanadium ions having an average charge of about 3.5+. In some embodiments, the concentration of the vanadium ions is about 1.25 M. The solution is stirred to dissolve the vanadium salts in the hot acid.

An iron salt 312, such as iron (II) chloride, is then added to the acid solution of the vanadium ions, to form a solution having, after dissolution, a concentration of between about 1.0 M and about 1.5 M of $Fe^{2+}$ ions. In some embodiments, the concentration of the iron atoms is about 1.25 M. Other iron salts 312 may be used, but the use of these salts may affect the solubility limits on the $V^{5+}$ ions.

The solution is stirred to complete dissolution, and then passed through a filter 314 to form the mixed ion electrolyte solution. The filter 314 can be a ceramic or other material selected to withstand the hot acid without corrosion.

In some embodiments, such as when a different type of reactor 304 is selected, for example, a loop reactor, a higher heat flux may be used to heat the acid 306 during the dissolution. However, the temperature that the acid 306 is allowed to reach at any point during the heating is limited by the solubility of the vanadium (V) ions in the acid 306.

Figure 4:
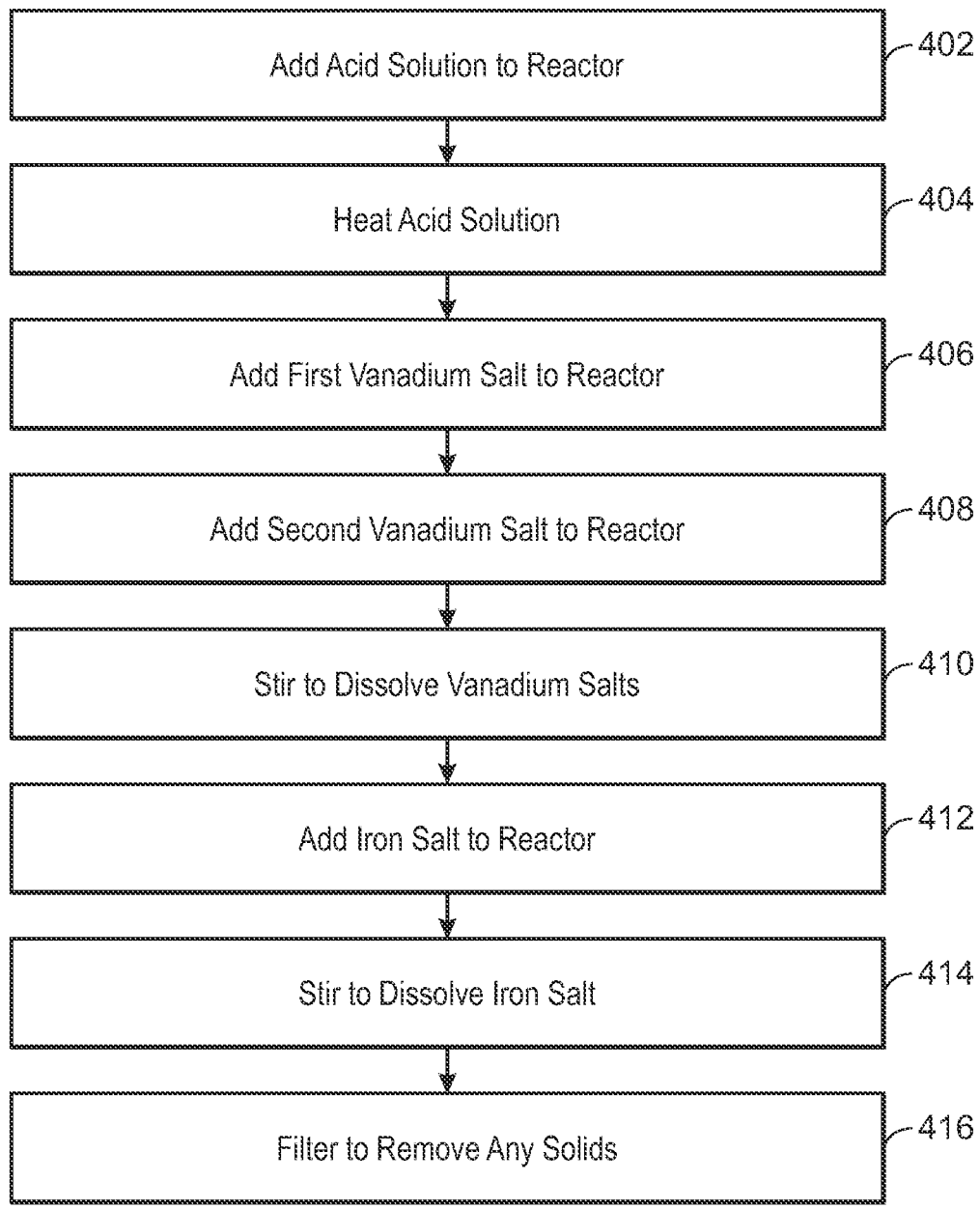
FIG. 4 is a process flow diagram of the method for making the mixed ion electrolyte solution.

FIG. 4 is a process flow diagram of the method of block 202 for making the mixed ion electrolyte solution. Like numbered items are as described with respect to FIG. 2. The method 202 begins at block 402 with the addition of the acid solution to the reactor. If the reactor is a batch reactor, the entire amount of acid is added at once. If the reactor is a continuous reactor, circulation is started through the reactor. At block 402, the acid solution is heated to promote the dissolution.

At block 404, the first vanadium salt is added to the reactor. At block 406, the second vanadium salt is added to the reactor. The vanadium salts may be blended before addition and added together. At block 408, the reactor is stirred to dissolve the vanadium salts. In an embodiment, the reactor is stirred for about 12 hours at a temperature of about 60° C. to dissolve the vanadium salts. The chemical reaction for the dissolution of the vanadium salts is shown in equation 1.

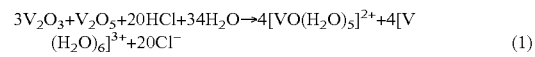

$$3V_2O_3 + V_2O_5 + 20HCl + 34H_2O \rightarrow 4[VO(H_2O)_5]^{2+} + 4[V(H_2O)_6]^{3+} + 20Cl^- \quad (1)$$

After the vanadium salts are dissolved, the heat may be discontinued, allowing the reactor to cool.

At block 410, the iron salt is added. At block 412, the reactor is stirred to dissolve the iron salts. In some embodiments, the reactor is stirred for about 20 hours at a temperature of about 20° C. The reactor does not need to be cooled to this temperature before the addition of the iron salt. The chemical reaction for the dissolution of the iron salts is shown in equation 2.

$$FeCl_2 \rightarrow Fe^{2+} + 2Cl^- \quad (2)$$

At block 414, the solution is filtered to remove any undissolved solids. The filtered solution is the mixed ion electrolyte that can be used as the catholyte and anolyte in a flow cell battery, as described in the examples below.

In some embodiments, the order of the blocks is different from that shown above. For example, the iron salt may be dissolved in the acid solution first, for example, as described with respect to blocks 410 and 412. The vanadium salts may then be dissolved, as described with respect to blocks 404 to 408, to prepare the final electrolyte solution.

EXAMPLES

Experimental

Preparation of Electrolyte

A mixed ion solution including Fe and V ions was prepared as described herein. The mixed reactant solution included 1.25-1.5 M Fe and an equimolar amount of vanadium, e.g., 1.25-1.5 M V, with 6.6-8.6 M Cl$^-$. The preparation was performed by dissolving 1.25-1.5 M iron(II) chloride (FeCl$_2$) powder into a 6.6-8.6 M Hydrochloric acid (HCl) solution at ambient temperature (20-25° C.), then stirring for 24 hours.

After that time, a mixture of V$_2$O$_3$ and V$^2$O$_5$ at a 50/50 molar ration was added to the FeCl$_2$ solution at an equimolar amount of vanadium to iron. The solution was heated to 60° C. and stirred for 12 hours. The resulting electrolyte solution is V$^{3.5+}$/Fe$^{2+}$ mixed solution, comprised of 50% of V$^{4+}$ and 50% of V$^{3+}$ plus Fe$^{2+}$ solution.

Electrochemical Test Cell

The mixed reactant solution was tested in an electrochemical test cell battery as both the catholyte and anolyte. Even though these solutions are not flowing, the terms catholyte and anolyte are retained for consistency. Referring to FIG. 1, the catholyte 104 is on the positive side during discharge, accepting electrons from the load, and the anolyte 102 is on the negative side during discharge, providing electrons to the load. The volume proportions were determined by the amount added to each side of the test cell. The test cell was separated by a sulfonated polytetrafluoroethylene membrane, available from Chemours of Wilmington, DE, USA under the Nafion® brand.

Example 1: Mixed Fe/V Electrolyte With a Vanadium Utilization in the Catholyte of 0%

An initial test used a charging voltage of 1.4 V and a 1:1 volume ratio of catholyte to anolyte. Using this charging voltage, only the iron ions in the catholyte react and only the vanadium ions in the anolyte react. This further explained with reference to FIG. 5.

Figure 5:
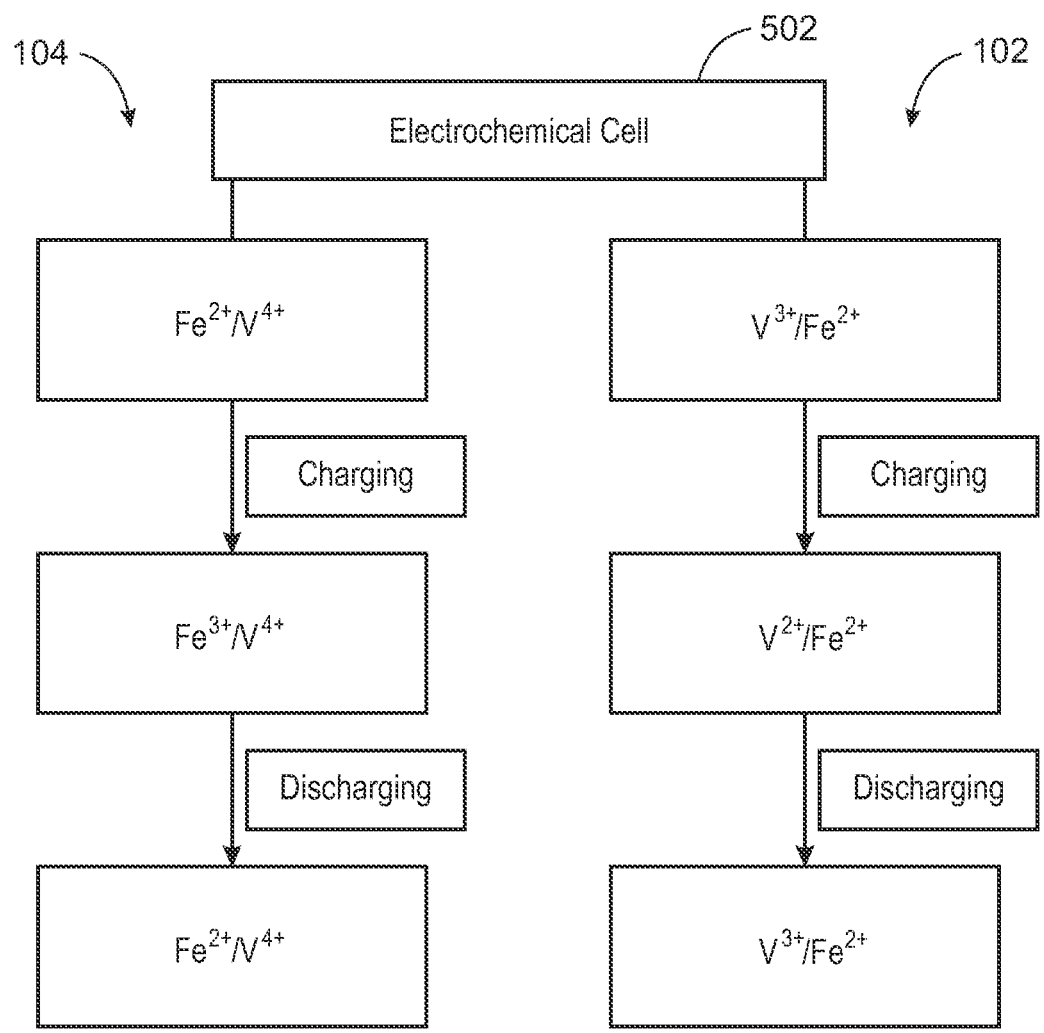
FIG. 5 is a schematic diagram of the operation of the charging and discharging of an electrochemical cell that includes the mixture of iron and vanadium ions in both catholyte and anolyte in equal volume ratios.

FIG. 5 is a schematic diagram of the operation of the charging and discharging of an electrochemical cell 502 that includes the mixture of iron and vanadium ions in both catholyte 104 and anolyte 102 in equal volume ratios. In this example, the cell is charged at a voltage of 1.4 V. During charging, Fe$^{2+}$ is oxidized to Fe$^{2+}$ in the catholyte 104. In the anolyte 102, charging reduces V$^{3+}$ to V$^{2+}$. When charged at 1.4 V the vanadium ions in the catholyte 104 do not participate in the reaction. The iron ions in the anolyte 102 do not participate in the reaction.

During discharging, the Fe$^{3+}$ ions in the catholyte 104 are reduced to Fe$^{2+}$ while the V$^{2+}$ ions in the anolyte 102 are oxidized to V$^{3+}$. As during charging, the iron ions in the anolyte 102 do not participate in the reaction.

Figure 6:
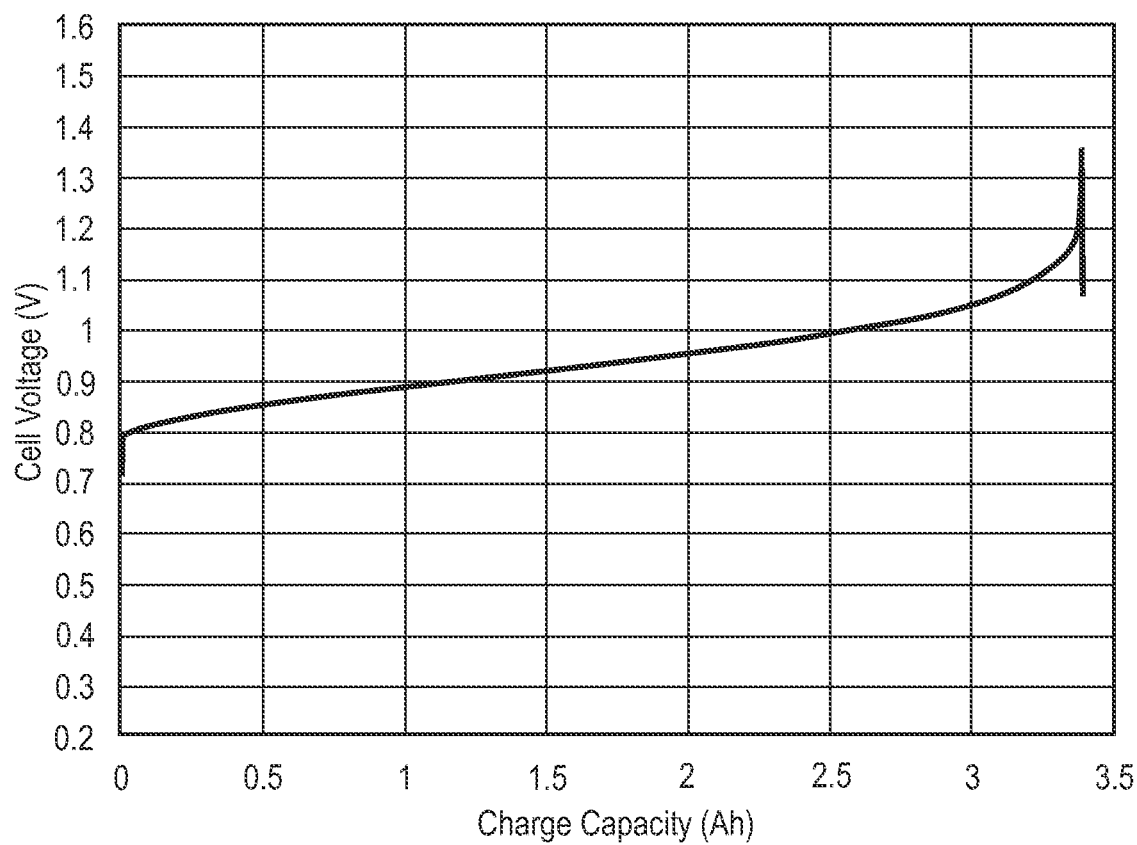
FIG. 6 is a plot of the charging performance of the flow cell battery of FIG. 5.

FIG. 6 is a plot of the charging performance of the flow cell battery of FIG. 5. The charging at 1.4 V provides a charge capacity of about 3.3 amp-hours (Ah).

Example 2: Mixed Fe/V Electrolyte With a Vanadium Utilization in the Catholyte of 50%

Figure 7:
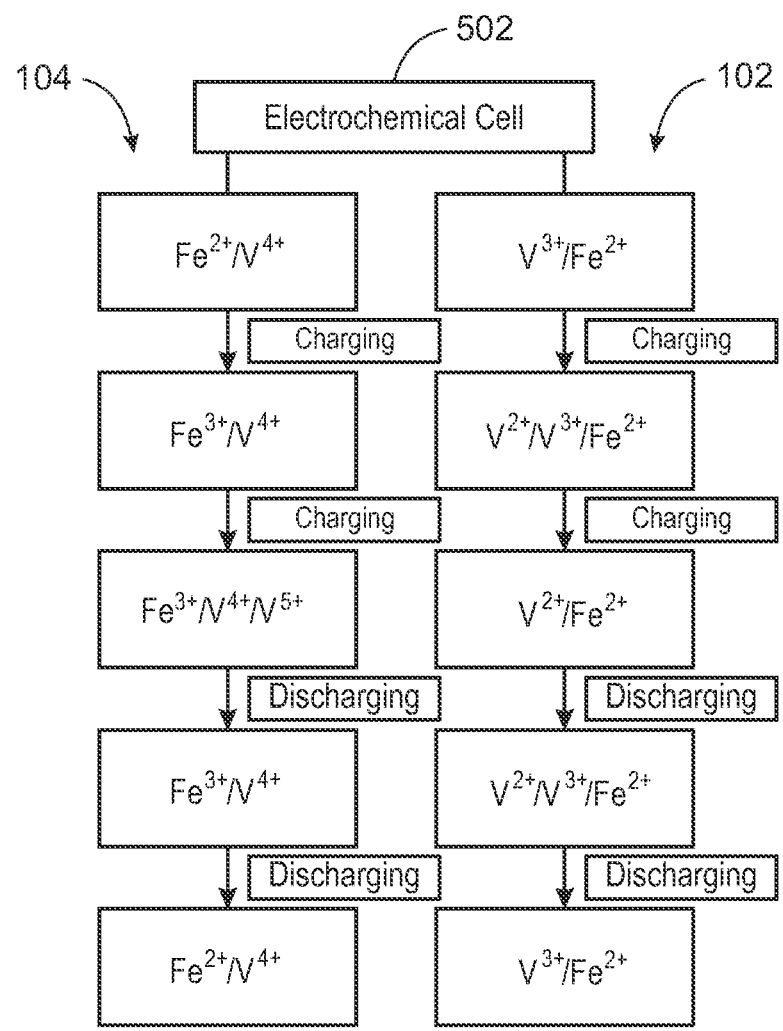
FIG. 7 is a schematic diagram of the operation of an electrochemical cell that includes a mixture of iron and vanadium ions in both catholyte and anolyte showing operational changes resulting from a higher charge voltage of 1.6 V.

FIG. 7 is a schematic diagram of the operation of an electrochemical cell 502 that includes a mixture of iron and vanadium ions in both catholyte 104 and anolyte 102 showing operational changes resulting from a higher charge voltage of 1.6 V. The higher charging voltage increases the energy density of the flow cell battery. The increase in the energy density can be realized by increasing the reactant utilization in the electrolyte. Since the vanadium component is a more expensive component of the Fe/V flow battery system, the increase of vanadium utilization not only improves the energy density but also lowers the electrolyte cost.

To take advantage of the increased energy density in the catholyte 104, the catholyte/anolyte volume ratio was set at 2:3. Specifically, the catholyte 104 included two molar volumes of iron ions and two molar volumes of vanadium ions, for a total of four molar volumes. The anolyte 102 included three molar volumes of iron ions and three molar volumes of vanadium ions, for a total of six molar volumes. This provides a ⅜ savings on the total amount of vanadium used over a battery without mixed electrolytes.

In this example, during charging, Fe$^{2+}$ is first oxidized to Fe$^{3+}$ in the catholyte 104. After the Fe$^{2+}$ ions are completely oxidized, the V$^{4+}$ is oxidized to form a mixture of V$^{4+}$ and V$^{5+}$ ions. The charging is controlled to convert only 50 to 60% of the V$^{4+}$ ions to V$^{5+}$ ions. This retains the stability of the solution at higher temperatures, for example, decreasing the probability of precipitation of V$^{5+}$ ions at operational temperatures around 40° C. In the anolyte 102, charging reduces V$^{3+}$ to V$^{2+}$. As for example 1, the iron ions in the anolyte 102 do not participate in the reaction.

During discharging, the V$^{5+}$ ions in the catholyte 104 are first reduced to V$^{4+}$ ions. Once the V$^{5+}$ ions are reduced, the Fe$^{3+}$ ions in the catholyte 104 are reduced to Fe$^{2+}$. During discharging, the V$^{3+}$ ions in the anolyte 102 are reduced to V$^{2+}$. As during charging, the iron ions in the anolyte 102 do not participate in the reaction.

As a result of the higher charge voltage and the changes in volume ratio, more than 50% vanadium in the positive electrolyte (catholyte) could be utilized, and therefore a 30% improvement in the energy density of the Fe/V cell is achieved, compared to the Fe/V cell operated at a lower charging voltage, as described with respect to FIGS. 5 and 6.

Figure 8:
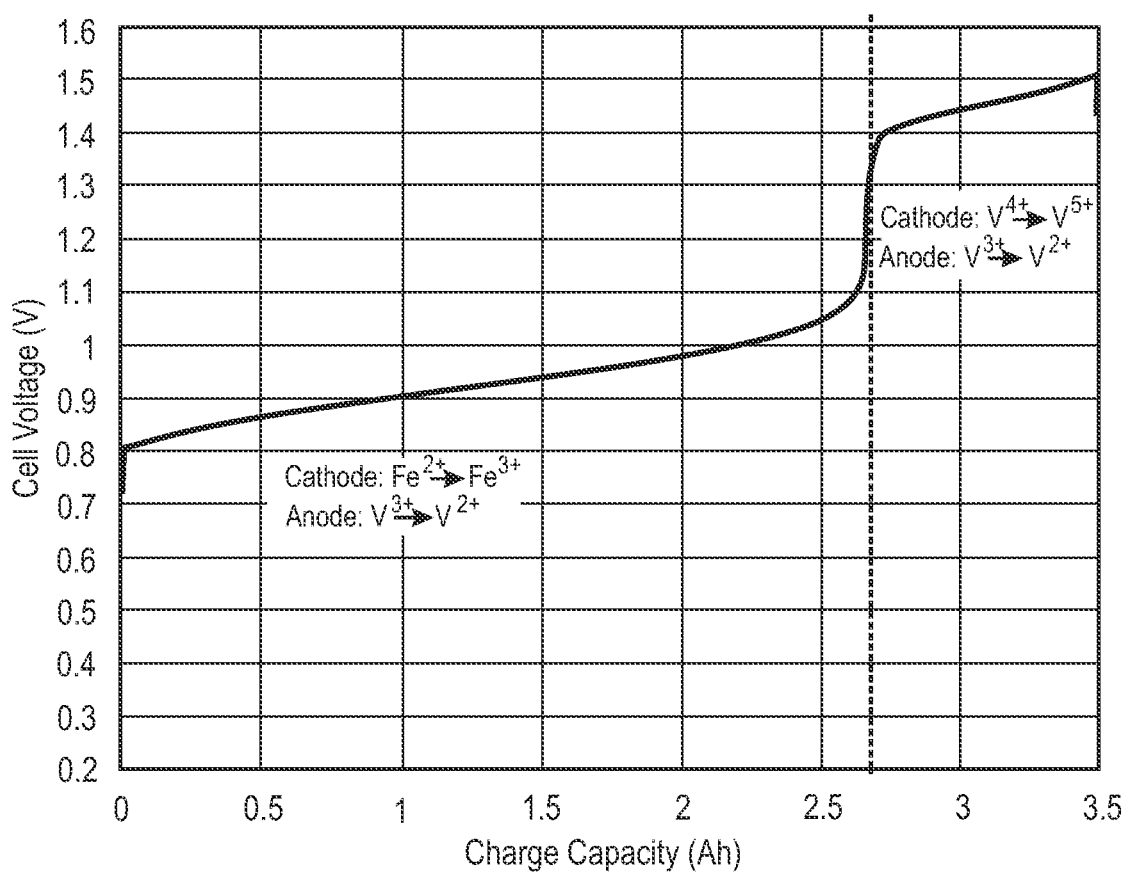
FIG. 8 is a plot of the charging of the electrochemical cell of FIG. 7.

FIG. 8 is a plot of the charging of the electrochemical cell of FIG. 7. This test was run with an electrolyte volume of 192 mL, using a NAFION® 212 membrane with an active area of 48 cm$^2$. The electrolyte used for both the anolyte and catholyte was 1.25 molar (M) V, 1.25 M Fe, 6.6 M Cl$^-$, and 0.8 M SO$_4^{2-}$. During charging, Fe$^{2+}$ in the catholyte is oxidized to Fe$^{3+}$. Once all of the Fe$^{2+}$ has been converted, the higher charging voltage drives the oxidation of V$^{4+}$ in the catholyte to V$^{5+}$. As described herein, the charging is controlled to avoid less than about 60% of the V$^{4+}$ being converted to V$^{5+}$, increasing the thermal stability at temperatures of about 40° C. In the anolyte, V$^{3+}$ is reduced to V$^{2+}$ during charging.

Embodiments

An embodiment described in examples herein provides an electrolyte for a flow cell battery. The electrolyte includes about 1.0 molar (M) to about 1.5 M iron ions, and about 1.0 M to about 1.5 M vanadium ions.

In an aspect, the electrolyte includes about 1.25 M iron ions. In an aspect, the electrolyte includes about 1.25 M vanadium ions. In an aspect, the electrolyte includes an equimolar amount of iron ions and vanadium ions.

In an aspect, the electrolyte includes about 5 M chloride (Cl⁻) to about 8 M Cl⁻. In an aspect, the electrolyte includes about 6.6 M Cl⁻. In an aspect, the electrolyte includes about 0.5 M sulfate ($SO_4^{2-}$) to about 1.0 M $SO_4^{2-}$. In an aspect, the electrolyte includes about 0.8 M $SO_4^{2-}$.

In an aspect, the electrolyte includes a base solution including hydrochloric acid. In an aspect, the electrolyte includes a catholyte for the flow cell battery. In an aspect, the electrolyte includes an anolyte for a flow cell battery.

Another embodiment described in examples herein provides a method for preparing an electrolyte for a flow cell battery. The method includes heating an acid solution, adding a first vanadium salt to the acid solution, and adding a second vanadium salt to the acid solution. The acid solution is stirred until both vanadium salts have dissolved. An iron salt is dissolved in the acid solution.

In an aspect, iron (II) chloride is added to the acid solution. In an aspect, the method includes the chemical reaction: $FeCl_2 \rightarrow Fe^{2+} + 2Cl^-$. In an aspect, the method includes dissolving an iron salt to form a solution of between about 1.0 Molar (M) iron ions and about 1.5 M iron ions. In an aspect, the method includes dissolving the iron salt to form a solution of about 1.25 M iron ions.

In an aspect, the method includes dissolving a mixture of vanadium (III) oxide ($V^2O_3$) and vanadium (V) oxide ($V^2O_5$) in the acid solution.

In an aspect, the method includes the chemical reaction:

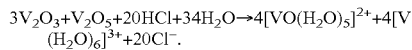

$3V_2O_3 + V_2O_5 + 20HCl + 34H_2O \rightarrow 4[VO(H_2O)_5]^{2+} + 4[V(H_2O)_6]^{3+} + 20Cl^-$.

In an aspect, the method includes dissolving the first vanadium salt and the second vanadium salt to form a solution of between about 1.0 Molar (M) vanadium ions and about 1.5 M vanadium ions. In an aspect, the method includes dissolving the first vanadium salt and the second vanadium salt to form a solution of about 1.25 M vanadium ions.

Another embodiment described in examples herein provides a flow cell battery. The flow cell battery includes an electrochemical cell. The electrochemical cell includes an ion exchange membrane, an anode current collector, and a cathode current collector, wherein a space between the ion exchange membrane and the anode current collector forms a first channel, a space between the ion exchange membrane and the cathode current collector forms a second channel, and wherein the ion exchange membrane is configured to allow ions to pass between the first channel and the second channel. The flow cell battery includes a first tank configured to flow an anolyte through the first channel at a first rate, and a second tank configured to flow a catholyte through the second channel at a second rate. The catholyte, or both the catholyte and the anolyte, includes about 1.0 molar (M) to about 1.5 M iron ions, and about 1.0 M to about 1.5 M vanadium ions.

In an aspect, the catholyte, or both the catholyte and anolyte, includes an equimolar solution of between about 1.25 M and 1.5 M iron ions and between about 1.25 M and 1.5 M vanadium ions.

In an aspect, the catholyte, or both the catholyte and anolyte, includes about 5 M chloride (Cl⁻) to about 8 M Cl⁻. In an aspect, the catholyte, or both the catholyte and anolyte, includes about 6.6 M Cl⁻.

In an aspect, the catholyte, or both the catholyte and anolyte, includes about 0.5 M sulfate ($SO_4^{2-}$) to about 1.0 M $SO_4^{2-}$. In an aspect, the catholyte, or both the catholyte and anolyte, includes about 0.8 M $SO_4^{2-}$.

In an aspect, the first rate is greater than the second rate. In an aspect, the ratio between the first and the second rate is 3:2. In an aspect, both the catholyte and anolyte include about 1.25 molar (M) V, about 1.25 M Fe, about 6.6 M Cl⁻, and about 0.8 M $SO_4^{2-}$.

Other implementations are also within the scope of the following claims.

What is claimed is:

1. A mixed ion electrolyte solution for use in a flow cell battery, comprising, as prepared and prior to use in the flow cell battery:
   a base solution comprising hydrochloric acid;
   1.25 molar (M) iron (Fe) ions;
   1.25 M vanadium (V) ions having an average charge of about 3.5+;
   6.6 M chloride (Cl⁻) ions; and
   0.8 M sulfate ($SO_4^{2-}$) ions, wherein the flow cell battery is operated at temperatures 40° C. and higher.

2. The mixed ion electrolyte solution of claim 1, wherein the mixed ion electrolyte solution is a catholyte for the flow cell battery.

3. The mixed ion electrolyte solution of claim 1, wherein the mixed ion electrolyte solution is an anolyte for the flow cell battery.

4. The mixed ion electrolyte solution of claim 1, wherein the V ions comprises about 50% $V^{4+}$ ions and 50% $V^{3+}$ ions.

5. A method for preparing a mixed ion electrolyte solution for use in a flow cell battery, comprising:
   heating an acid solution comprising a first vanadium salt comprising vanadium (III) oxide ($V_2O_3$) and a second vanadium salt comprising vanadium (V) oxide ($V_2O_5$) to dissolve said first and second vanadium salts, the acid solution comprising hydrochloric acid; and
   dissolving an iron salt comprising iron (II) chloride ($FeCl_2$) in the acid solution, wherein the mixed ion electrolyte solution comprises:
   1.25 molar (M) iron (Fe) ions;
   1.25 M vanadium (V) ions having an average charge of about 3.5⁺;
   6.6 M chloride (Cl⁻) ions; and
   0.8 M sulfate ($SO_4^{2-}$) ions, wherein the flow cell battery is operated at temperatures 40° C. and higher, and the mixed ion electrolyte solution has the above composition as prepared and prior to use in the flow cell battery.

6. The method of claim 5, wherein the acid solution is heated at a temperature of about 60° C.

7. The method of claim 5, wherein the acid solution is heated for about 12 hours.

* * * * *